United States Patent [19]

Wozny et al.

[11] Patent Number: 5,399,644

[45] Date of Patent: Mar. 21, 1995

[54] SULFUR DIOXIDE FOR VAPOR PHASE ELIMINATION OF STYRENE AND ACRYLONITRILE POPCORN POLYMER IN BULK SAN PRODUCTION

[75] Inventors: John C. Wozny, Coolville, Ohio; Chen-Youn Sue, Williamstown; John E. Pace, Washington, both of W. Va.

[73] Assignee: General Electric Company, Pittsfield, Mass.

[21] Appl. No.: 255,106

[22] Filed: Jun. 7, 1994

Related U.S. Application Data

[63] Continuation of Ser. No. 920,725, Jul. 28, 1992, abandoned.

[51] Int. Cl.$^6$ .................... C08F 2/02; C08F 212/10
[52] U.S. Cl. .................... 526/234; 526/342; 526/917; 525/243; 525/244
[58] Field of Search .................... 526/234, 342, 917; 525/243, 244, 261

[56] References Cited

U.S. PATENT DOCUMENTS

| | | |
|---|---|---|
| 2,371,719 | 3/1945 | Starkweather .................. 526/234 X |
| 2,694,692 | 11/1954 | Amos et al. . |
| 2,727,884 | 4/1953 | McDonald et al. . |
| 3,201,365 | 6/1991 | Charlesworth et al. . |
| 3,243,481 | 3/1966 | Ruffing et al. . |
| 3,509,237 | 4/1970 | Auberry . |
| 3,658,735 | 4/1972 | Nakao et al. . |
| 3,660,535 | 5/1972 | Finch et al. . |
| 3,660,536 | 5/1972 | Ayano et al. . |
| 3,692,504 | 9/1972 | Canterino et al. . |
| 3,903,202 | 9/1975 | Carter et al. . |
| 3,964,979 | 6/1976 | Watson . |
| 4,221,833 | 9/1980 | Guillermin et al. . |
| 4,239,863 | 12/1980 | Bredeweg . |
| 4,326,051 | 4/1982 | Suling et al. . |
| 4,338,162 | 7/1982 | Johnson . |
| 4,387,179 | 6/1983 | Sun . |
| 4,612,348 | 9/1986 | Sun . |
| 4,640,959 | 9/1983 | Narasaiah . |

FOREIGN PATENT DOCUMENTS

| | | |
|---|---|---|
| 672031 | 3/1966 | Belgium . |
| 677334 | 3/1966 | Belgium . |
| 1161993 | 7/1984 | Canada . |
| 2743348 | 4/1979 | Germany . |
| 3434138 | 3/1986 | Germany . |
| 57-137309 | 8/1982 | Japan . |
| 58-049479 | 3/1983 | Japan . |
| 58-201619 | 11/1983 | Japan . |
| 0799474 | 8/1958 | United Kingdom ................ 526/234 |
| 1218233 | 11/1968 | United Kingdom . |

OTHER PUBLICATIONS

Monatshefte for Chemie, vol. 106, No. 3 pp. 649–656, 1976).

Mh. Chem., vol. 98, No. 5, pp. 1, 767–1, 771, 1967.

Pending U.S. Patent Application #07/920,956 Nitric Oxide for Vapor Phase Elimination of Styrene and Acrylonitrile Popcorn Polymer in Bulk San Production.

*Primary Examiner*—Fred Teskin

[57] ABSTRACT

A bulk or mass polymerization process is provided which involves bulk polymerization of vinyl monomers in a liquid phase in the presence of a nitrogen rich vapor phase containing amounts of sulfur dioxide effective to inhibit formation of popcorn polymer during the reaction. The process may be used as a step in the formation of polymer or may be used as the entire reaction process.

6 Claims, No Drawings

SULFUR DIOXIDE FOR VAPOR PHASE ELIMINATION OF STYRENE AND ACRYLONITRILE POPCORN POLYMER IN BULK SAN PRODUCTION

This is a continuation of application Ser. No. 07/920,725, filed Jul. 28, 1992, now abandoned.

BACKGROUND OF THE INVENTION

1. Field of the Invention

The present invention relates to bulk polymerization processes for making vinyl aromatic/vinyl cyanide copolymers, and more particularly relates to bulk polymerization processes having a vapor phase additive which inhibits popcorn formation.

2. DESCRIPTION OF THE RELATED ART

Mass or bulk polymerization techniques for making copolymers of monoethelenically unsaturated polar monomers and monovinylidene aromatic monomers are known, see U.S. Pat. Nos. 3509237; 3660535; 3243481; 4221833 and 4239863, all of which are incorporated herein by reference. Such copolymers may be rubber modified graft copolymers or may be rubber-free rigid copolymer. Typical bulk processes, such as those involving a boiler reactor, typically involve a liquid phase reaction covered by a nitrogen (N2) atmosphere. In boiler reactors, heat is added to the reactor to cause boiling of the liquid monomeric composition. Boiled monomer then enters the nitrogen vapor phase, contacts the reactor dome, which is typically air or water cooled, condenses and returns to the liquid phase. Condensed monomer on the reactor dome will generate undesired, crosslinked popcorn polymer. Popcorn generation at the dome surface may be due in part to the nonvolatility of typical crosslink inhibitors in the liquid phase which do not volatilize with the monomeric composition, thereby necessitating that an inhibitor be present in the vapor phase if popcorn formation is to be inhibited. In the past, inhibitors such as oxygen have been incorporated into the vapor phase to prevent popcorn formation. It is believed, however, that oxygen may oxidize the polymer and may contribute to the formation of black carbonaceous material on the reactor walls. Analysis of the black material has indicated that the material has a high oxygen content which tends to support the proposition that the oxygen inhibitor is part of the cause of the formation thereof. Additionally, oxygen ($O_2$) has a high solubility in many liquid organic monomers which tends to support the proposition that the oxygen is present in the liquid monomer phase during the bulk polymerization process.

Accordingly, there is a need for vapor phase additives which will inhibit popcorn formation in bulk polymerization processes.

SUMMARY OF THE INVENTION

The present invention involves a bulk or mass polymerization process wherein vinyl monomers are reacted in a liquid phase which is blanketed by a vapor phase of diatomic nitrogen atmosphere comprising sulphur dioxide. The sulphur dioxide inhibits popcorn polymer formation during the bulk polymerization process.

DETAILED DESCRIPTION OF THE INVENTION

The present invention involves a bulk or mass polymerization process wherein a liquid phase comprising vinyl monomers is heated to cause polymerization of the monomers. The liquid phase is blanketed by a nitrogen rich vapor phase that comprises an amount of sulfur dioxide effective to prevent popcorn polymer formation. While the sulfur dioxide prevents popcorn formation, applicants also believe that it accelerates the polymerization of the monomers in the liquid phase.

The vinyl monomers, in the absence of an effective inhibitor, are susceptible to the formation of a hard, brittle, highly crosslinked polymer, which is referred to as "popcorn polymer" in the prior art because of its physical appearance.

Compounds suitable for homopolymerization and/or copolymerization in the process of this invention include vinyl monomers in the following classes:

1. (Alkyl)acrylates which are polymerizable organic compounds containing a single ethylenic double bond conjugated with a carbon to oxygen double bond, i.e., compounds containing the structure:

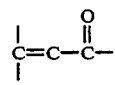

2. Vinyl cyanide monomers which are polymerizable organic compounds containing a single ethylenic double bond conjugated with a carbon to nitrogen triple bond, i.e., compounds containing the structure:

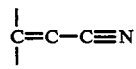

3. Vinyl aromatic monomers which are polymerizable organic monomers containing a single ethylenic double bond conjugated with a carbon atom in an aromatic nucleus.

Examples of monomers in class 1 include acrylic, methacrylic, ethacrylic and crotonic acid, and esters thereof, wherein the ester group contains one to 18 carbon atoms and wherein the alkyl group contains 1 to about 4 carbon atoms.

Specific examples of class 1 monomers are methyl acrylate, ethyl acrylate, isopropyl acrylate, butyl acrylate, 2-ethylhexyl acrylate, dodecyl acrylate, octadecyl acrylate, methyl methacrylate, butyl methacrylate, 2-ethylhexyl methacrylate, ethyl ethacrylate, octyl ethacrylate, methyl crotonate, heptyl crotonate, cyclohexyl acrylate, cyclohexyl methacrylate, benzyl acrylate, isobornyl acrylate and phenyl methacrylate. Preferably the alkyl acrylate monomer is methyl methacrylate.

Also included as useful ester monomers are hydroxyalkyl esters of acrylic, methacrylic, ethacrylic, ethacrylic or crotonic acids wherein the hydroxyalkyl group contains 2 to 10 carbon atoms and is, preferably, a beta-hydroxyalkyl group. Examples of hydroxyalkyl ester monomers are beta hydroxyethyl acrylate, beta hydroxyethyl methacrylate, beta hydroxyethyl crotonate, beta hydroxyethyl ethacrylate, beta hydroxypropyl acrylate, beta-hydroxy propyl methacrylate, gamma hydroxypropyl methacrylate, beta-hydroxybutyl acrylate, gamma hydroxybutyl methacrylate, delta hydroxybutyl crotonate, beta hydroxyoctyl acrylate and beta hydroxy-decyl methacrylate.

Homopolymerizable and/or copolymerizable monomers in class 2 are acrylonitrile, methacrylonitrile, ethacrylonitrile, crotonic nitrile, etc. Preferably the vinyl cyanide monomer is acrylonitrile.

Polymerizable monomers in class 3 include styrene, vinyl toluene, vinyl naphthalene, α-methyl styrene chlorostyrene, bromostyrenes and the like. Preferably the vinyl aromatic monomer is styrene.

The process of the present invention may involve reacting a vinyl monomer feed stream in a batch, semi-batch or continuous process manner. The feedstream preferably comprises from about 20 to about 80 percent by weight of vinyl cyanide monomer based on the total weight of the liquid feed stream and from about 80 to about 20 percent by weight of vinyl aromatic monomer based on the total weight of the liquid feed stream and from about 0 to about 30 percent by weight of a diluent based on the total weight of the liquid feed stream. The diluent serves as a solvent for styrene and acrylonitrile monomers and as a diluent for a styrene and acrylonitrile containing polymer. Preferably liquid feed stream comprises from 65 to 85 percent by weight vinyl aromatic monomer based on the total weight of the feed stream and from 15 to 35 percent by weight vinyl cyanide monomer based on the total weight of the feed stream. Preferably the feedstream is passed into a polymerization zone in either a batch, semi batch or continuous manner wherein the feedstream becomes a liquid phase reaction mass, in the presence of a nitrogen vapor phase blanket, is maintained at a temperature of from about 120° C., to about 170° C. under a pressure of from about 10 to about 300 pounds per square inch (hereinafter "psi") whereby at least a portion of the feedstream is thereafter subjected to heat and vacuum sufficient to remove at least a major portion of any residual unpolymerized components of the feedstream including the diluent. The improvement being the incorporation within the nitrogen vapor phase of a sulfur dioxide polymerization initiator at from about 0.05 to 5 parts by volume per hundred parts by volume of nitrogen over the feedstream. The attaining and maintaining of a level of sulfur dioxide in the vapor phase over the liquid phase reaction mass in the polymerization zone while the liquid phase reaction mass is being polymerized. Preferably the sulfur dioxide is not present at a level of less than 0.1 parts by volume per hundred parts by volume of the diatomic nitrogen in the vapor phase over the liquid phase reaction mass. The residence time of the liquid phase reaction mass within the polymerization zone being preferably from about 0.7 to about 1.4 hours.

The vinyl aromatic monomer is preferably of commercial purity and is present at a level of from about 85 to 20 percent by weight based on the total weight of the feedstream and more preferably at a level of from 65 to 85 percent by weight thereof. Correspondingly, the liquid phase reaction mass preferably initially has the vinyl aromatic monomer present at a level of from 85 to 20 percent by weight based on the total weight of the liquid phase reaction mass, and more preferably at a level of 65 to 85 percent by weight thereof.

The vinyl cyanide monomer is preferably of commercial purity and is present at a level of from 15 to 80 percent by weight based on the total weight of the feedstream composition, and more preferably at a level of from 15 to 35 percent by weight thereof. Correspondingly, the liquid phase reaction mass preferably initially has the vinyl cyanide monomer present at a level of from 15 to 80 percent by weight based on the total weight of the liquid phase reaction mass, and more preferably at a level of from 15 to 35 percent by weight thereof.

The diluent is advantageously a solvent in which the styrene and acrylonitrile monomers are soluble and is ultimately used to adjust the viscosity of the liquid phase reaction mass. More advantageously, the diluent is selected from the group consisting of ethylbenzene and N,N-dimethylformamide in an amount of from about 0 to about 30 parts by weight, based upon the total weight of the feedstream. Beneficially, the diluent is selected from the group consisting of ethylbenzene and N,N-dimethylformamide in an amount of from about 15 to about 25 parts by weight, based upon the total weight of the feedstream. Preferably, the diluent consists of from about 15 to 25 parts by weight, based upon the total weight of the feedstream of ethylbenzene.

The feedstream preferably consists of from about 85 to about 15 parts by weight of styrene, from about 20 to about 80 parts by weight of acrylonitrile, and from about 0 to about 30 parts by weight of a diluent such as ethylbenzene. Optionally, other vinyl monomers may be used. Also, optionally, the process may be used for making a rubber modified polymer, for example an ABS graft copolymer or an ASA copolymer as set out below by including in the feedstream a rubbery polymer such as polybutadiene or polybutylacrylate. Bulk polymerization of a rubber modified polymer typically involves dissolving of the rubbery polymer in the monomeric composition followed by polymerization of the monomers to yield a grafted copolymer followed by phase inversion and completion of the reaction to build molecular weight and crosslink the rubber.

In practicing the process of this invention, one may use a recirculating coil apparatus, a recirculating tube train apparatus or a boiling reactor. The polymerization initiator is added to the feedstream after mixing and prior to being passed into a polymerization zone. Advantageously, the feedstream is subjected to temperatures of from about 120° C. to about 170° C. and to pressures of from about 10 to about 300 psi. Preferably the feedstream is subjected to temperatures of from about 135° C. to about 155° C. and to pressures of from about 100 to about 200 psi for the recirculating coil apparatus and the recirculating tube train apparatus or from about 10 to about 60 psi for the boiling reactor. At temperatures in excess of about 170° C., cooling of the reactor becomes very difficult. At temperatures below about 120° C., the polymerization rate is too low for the purposes of commercial or practical application, thereby necessitating an increase in the amount of time which the feedstream must remain within the polymerization zone which in turn may lead to undesirable products, some of which may have excessive molecular weights. In addition, when using either the recirculating coil apparatus or the recirculating tube train apparatus, the pressures must be maintained above the vapor pressure of the component with the lowest boiling point in order to prevent polymerization within the vapor phase, but below the preferred maximum of about 300 psi as pressures in excess of about 300 psi may cause structural changes in the polymer which may cause the process to become uneconomical.

When using the boiling reactor, the rate of reaction within the boiling reactor will be difficult to control at pressures in excess of 60 psi. At pressures of less than 10 psi, the process would be uneconomical for commercial or practical purposes as it would lead either to excessive molecular weight polymers or to the use of uneconomical amounts of additives such as catalysts and chain-transfer agents.

The rate of feed into a polymerization vessel is determined by the length of residence time of the feedstream in the polymerization zone within the polymerization vessel which in turn is determined by the portion of the feedstream which is to be polymerized. The residence time is preferably from about 0.7 to about 1.4 hours. Most preferably, the residence time is from about 0.9 to about 1.1 hours. If a residence time of less than about 0.7 hour is selected, the heat of reaction under the preferred range of operating conditions would be too great and would require too much diluent to control the reaction, thereby making the process uneconomical. If a residence time in excess of 1.4 hours is selected, the color is detrimentally affected and the process becomes uneconomical.

The product of the polymerization process is subjected to heat and vacuum sufficient to remove at least a major portion of any residual unpolymerized components of the feedstream, such as the diluent, the styrene and acrylonitrile monomers, and the polymerization initiator.

Any of the well known solvents can be used as a reaction medium for conducting the process of this invention, such solvents being aromatic, cycloaliphatic and aliphatic hydrocarbons, ketones, esters, ethers, alcohols and the like. However, as stated herein before it is preferred to carry out the polymerizations as bulk polymerizations wherein no solvent is used.

The process of the present invention preferably involves mass polymerization of styrene and acrylonitrile in a liquid phase blanketed by a nitrogen atmosphere containing 0.1 to 1 weight percent Sulfur dioxide as an inhibitor of crosslinked SAN popcorn formation in the reactor vessel.

The process of the present invention may also be used to prevent popcorn formation in the production of bulk vinyl aromatic/vinyl cyanide/rubber graft copolymers such as bulk ABS or a rubber modified polymer such as vinyl aromatic/vinyl cyanide/butyl acrylate copolymers such as bulk ASA.

The "ABS resin prepared by bulk polymerization" employed in this invention means a product obtained by dissolving a butadiene type rubber, such as polybutadiene or a butadiene-styrene copolymer, into a mixture of a vinyl cyano compound represented by acrylonitrile and a vinyl aromatic hydrocarbon (including a halogenated compound) represented by styrene, polymerizing the mixture substantially under bulk polymerization conditions, under such a high agitation as to shear the rubber being precipitated as polymerization advances, until the polymerization is substantially completed. The amount of the rubber to the total amount of the monomer mixture (styrene plus acrylonitrile) is 1-50 wt. percent, preferably 2-20 wt. percent. The monomer mixture preferably contains 85 to 65 percent by weight of styrene to 15 to 35 percent by weight of acrylonitrile based on the total combined weight of the styrene and acrylonitrile.

The present process may also be employed as a step in a multistep polymerization process including, for example, a bulk suspension process such as for the production of vinyl aromatic/vinyl cyanide/rubber graft copolymers wherein the bulk process is employed, until 10-40 percent by weight of the vinyl cyano compound and vinyl aromatic compound are polymerized, and then adding water and a suspension stabilizer to the polymerization system and continuing the polymerization under the suspension polymerization conditions until the polymerization is substantially completed.

The following examples illustrate the improvements which result from the process of this invention but are not in limitation thereof.

The invention was experimentally examined on a 2-gallon reactor facility in a continuous process. There are three basic units in this facility (monomer feed unit, reactor unit, and devolatilization/pelletization unit) for SAN synthesis in a bulk process. Two different control experiments are carried out. The first one is the control experiment that produces significant amount of SAN popcorn polymer (about 20 grams) in the vapor head space of the 2-gallon reactor over a given reaction time length (40 hours), using only nitrogen (>99.95%) as the reaction atmosphere. The second one is also the control experiment that produces no SAN popcorn polymer over the same reaction hours, using 2% oxygen in nitrogen (by volume). The copolymerization reactions for all the experiments are set at the same reaction conditions except that the reaction atmospheres are different from one to another. The experiments using 2% sulfur dioxide in nitrogen (by volume) show that sulfur dioxide eliminates the formation of SAN popcorn polymer in the vapor head space. Table 1 shows conditions and results for some of these experiments.

Kinetic data of SAN copolymerization under sulfur dioxide/nitrogen mixture and characterization data of the corresponding SAN polymer suggest that sulfur dioxide may also be used as a dual-function catalyst. That is, the sulfur dioxide/nitrogen atmosphere will not only accelerate rates of copolymerization of ST and AN but also increase molecular weights (number average and weight average) of SAN polymer comparing with the SAN polymers obtained from control ones.

TABLE 1

Conditions and Results for SAN Popcorn Polymer Prevention Experiments Using a 2-Gallon Reactor Facility*

| Expt. No. | ST/AN/NOM (Wt.)** | Rx. Temp. °C. | Rx. Atm. | Rx. Hrs. | SAN Popcorn |
|---|---|---|---|---|---|
| A | 69/31/0.15 | 120 | $N_2$ | 40 | 22 g |
| B | 69/31/0.15 | 120 | 2.0% $O_2$ in $N_2$ | 40 | 0 |
| 1 | 69/31/0.15 | 120 | 2.0% $SO_2$ in $N_2$ | 40 | 0 |

*The reactor top lid was cooled by compressed air and was kept at 70 to 75° C.
**ST/AN/NOM: styrene/acrylonitrile/n-octyl mercaptan feed ratio by weight.
Rx. Temp. means reaction temperature.
Rx. Atm. means vapor phase atmosphere.
Rx. Hrs. means reaction time.
SAN Popcorn means the amount of SAN popcorn formed during the reaction.

As mentioned above, one possible advantage of using sulfur dioxide is its ability to accelerate the polymerization of the monomers in the liquid phase while inhibiting popcorn formation in the vapor phase. The process may be employed as a step in bulk-suspension processes, or may be used as the entire polymerization process. A suitable vapor phase comprises less than 0.1 percent by volume diatomic oxygen based on the total volume of the vapor phase. Preferably the vapor phase comprises less than 0.05 percent by volume diatomic oxygen based on the total volume of nitrogen in the vapor phase.

We claim:

1. A bulk polymerization process comprising reacting vinyl monomers in a liquid phase, said liquid phase comprising styrene and acrylonitrile, said liquid phase being in the presence of a vapor phase comprising diatomic nitrogen and sulfur dioxide, said sulfur dioxide being present at a level sufficient to inhibit popcorn polymer formation.

2. The process of claim 1 wherein said liquid phase additionally comprises linear polybutadiene polymer.

3. The process of claim 1 wherein said liquid phase additionally comprises polybutylacrylate.

4. The process of claim 1 wherein said sulfur dioxide is present at a level of from 0.01 to 1 percent by volume based on the total volume of the vapor phase.

5. The process of claim 1 wherein said vapor phase comprises less than 0.1 percent by volume diatomic oxygen based on the total volume of the vapor phase.

6. The process of claim 1 wherein said liquid phase comprises from 65 to 85 percent by weight styrene based on the total weight of said liquid phase, and said liquid phase comprises from 15 to 35 percent by weight acrylonitrile based on the total weight of said liquid phase.

* * * * *